(12) United States Patent
Venkatesh et al.

(10) Patent No.: US 8,705,679 B1
(45) Date of Patent: Apr. 22, 2014

(54) METHOD AND APPARATUS FOR CLEAR CHANNEL ASSESSMENT QUALIFICATION

(75) Inventors: Swaroop Venkatesh, Dublin, CA (US); Sergey Timofeev, Santa Clara, CA (US); Sudhir Srinivasa, Sunnyvale, CA (US); Atul Salhotra, Santa Clara, CA (US); Rohit U. Nabar, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 381 days.

(21) Appl. No.: 13/053,850

(22) Filed: Mar. 22, 2011

Related U.S. Application Data

(60) Provisional application No. 61/316,288, filed on Mar. 22, 2010.

(51) Int. Cl.
  *H04L 7/06* (2006.01)
(52) U.S. Cl.
  USPC .......................................... 375/368
(58) Field of Classification Search
  USPC .................................. 375/365, 368
  See application file for complete search history.

(56) References Cited

U.S. PATENT DOCUMENTS

| | | | | |
|---|---|---|---|---|
| 7,450,654 B2 * | 11/2008 | Singh et al. | ................... | 375/260 |
| 2008/0137761 A1 * | 6/2008 | Stadelmeier et al. | .......... | 375/260 |
| 2009/0268798 A1 * | 10/2009 | McNamara | ................... | 375/226 |

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band,"*The Institute of Electrical and Electronics Engineers, Inc.*, Apr. 2003.

(Continued)

*Primary Examiner* — Kevin Kim

(57) ABSTRACT

In a method for detecting a synchronization field in an orthogonal frequency division multiplexing (OFDM) signal, a plurality of discrete Fourier transform (DFT) values corresponding to the OFDM signal are generated. A plurality of magnitude or power values corresponding to the plurality of DFT values is determined. It is determined whether the plurality of magnitude or power values corresponds to a pattern of magnitude or power values. An indication that the synchronization field is detected in the OFDM signal is generated based on whether it is determined that the plurality of magnitude or power values correspond to the pattern of magnitude or power values.

19 Claims, 10 Drawing Sheets

(56) References Cited

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireleass LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

* cited by examiner

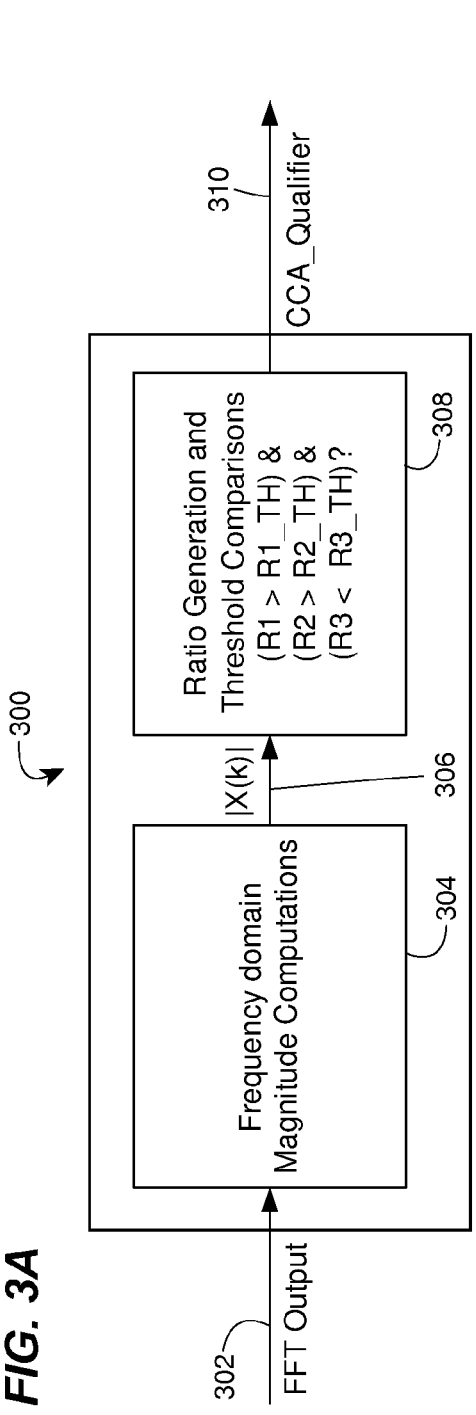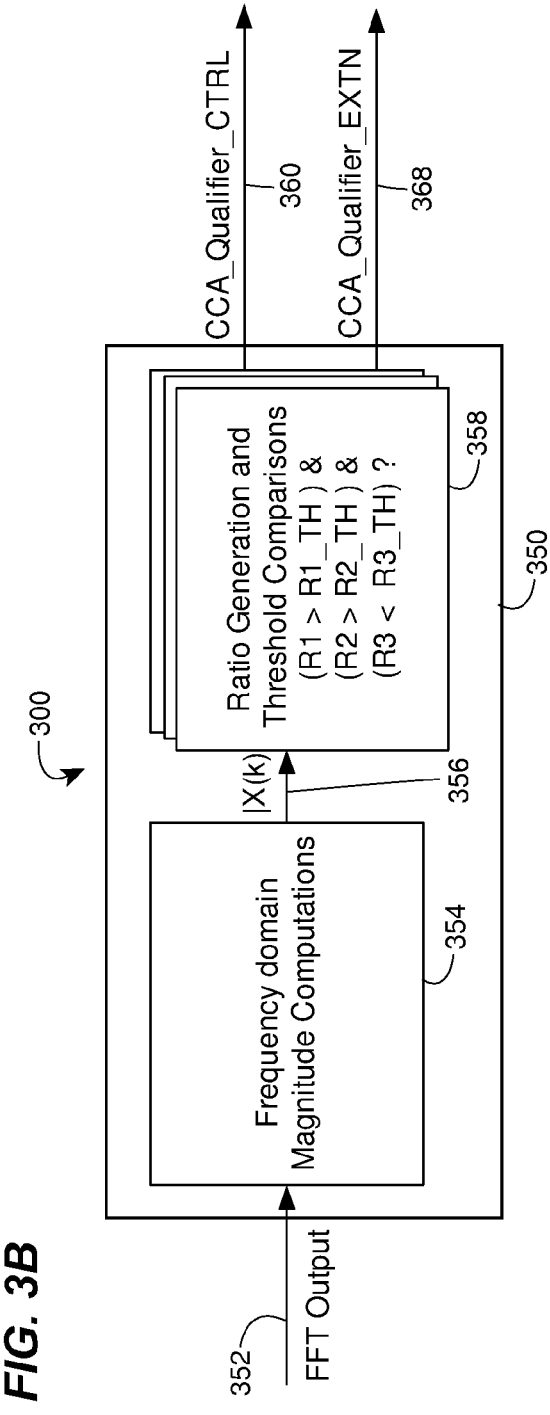

METHOD AND APPARATUS FOR CLEAR CHANNEL ASSESSMENT QUALIFICATION

CROSS-REFERENCES TO RELATED APPLICATION

The present application claims the benefit of U.S. Provisional Patent Application No. 61/316,288, entitled "FFT-based CCA for Improved 802.11a/g/n OFDM detection," filed on Mar. 22, 2010, which is hereby incorporated by reference herein in its entirety.

FIELD OF TECHNOLOGY

The present disclosure relates generally to OFDM-based communication systems and, more particularly, to assessment of a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps.

It is useful to detect the beginning of a transmission in a wireless network for various reasons such as synchronizing to the transmission in order to properly receive the transmission, assessing whether a channel is clear before transmission, etc. According to the IEEE 802.11a/g/n Standards, each transmission includes a synchronization field having a periodic pattern. It is typical to use autocorrelation at a receiver to detect the synchronization field.

SUMMARY

In an embodiment, a method for detecting a synchronization field in an orthogonal frequency division multiplexing (OFDM) signal comprises generating a plurality of discrete Fourier transform (DFT) values corresponding to the OFDM signal, and determining a plurality of magnitude or power values corresponding to the plurality of DFT values. The method also comprises determining whether the plurality of magnitude or power values corresponds to a pattern of magnitude or power values. Additionally, the method comprises generating an indication that the synchronization field is detected in the OFDM signal based on whether it is determined that the plurality of magnitude or power values correspond to the pattern of magnitude or power values.

In another embodiment, a method for detecting a synchronization field in an OFDM signal comprises generating a first indicator that the synchronization field is detected in the OFDM signal based on an output of a correlator, and generating a plurality of DFT values corresponding to the OFDM signal in response to the first indicator. Additionally, the method comprises determining a plurality of magnitude or power values corresponding to the plurality of DFT values, and determining whether the plurality of magnitude or power values correspond to a pattern of magnitude or power values. Also, the method comprises generating a second indicator that the synchronization field is detected in the OFDM signal based on whether it is determined that the plurality of magnitude or power values correspond to the pattern of magnitude or power values.

In yet another embodiment, an apparatus comprises a magnitude calculator to generate magnitudes of DFT values corresponding to an OFDM signal, and a ratio generator to generate one or more ratios based on the magnitudes. The apparatus additionally comprises a comparator to generate an indicator of a synchronization field in the received OFDM signal based on comparisons of the one or more ratios to respective one or more thresholds.

In still another embodiment, an apparatus comprises an autocorrelator to generate a first indicator that a synchronization field is detected in a received OFDM signal, and a DFT calculator to generate DFT values corresponding to the received OFDM signal in response to the first indicator. The apparatus also comprises a magnitude calculator to generate magnitudes of DFT values corresponding to the received OFDM signal, and a ratio generator to generate one or more ratios based on the magnitudes. The apparatus additionally comprises a comparator to generate a second indicator of a synchronization field in the received OFDM signal based on comparisons of the one or more ratios to respective one or more thresholds.

BRIEF DESCRIPTION OF THE DRAWINGS

FIG. 3A is a diagram of an example clear channel assessment processor for assessing a 20 MHz primary channel, according to an embodiment.

FIG. 3B is a diagram of another example clear channel assessment processor for assessing a 20 MHz primary channel and a 20 MHz secondary channel, according to another embodiment.

DETAILED DESCRIPTION

In embodiments described below, a wireless network device such as access point (AP) and client devices of a wireless local area network (WLAN) transmit data streams between the AP and the client devices over a communication channel. In some of the embodiments the communication channel is 20 MHz wide. In other embodiments, the communication channel is 40 MHz wide. In an embodiment, one or more of the network devices may conform to the IEEE 802.11a Standard. In another embodiment, one or more of the network devices may conform to the IEEE 802.11g Standard. In still other embodiments, one or more of the network devices may conform to the IEEE 802.11n Standard. In various embodiments, various combinations of network devices conform to various combinations of the IEEE 802.11a/g/n Standards. In other embodiments, network devices conform to suitable communication protocols other than the protocols specified in the IEEE 802.11a/g/n Standards.

In embodiments described below, a network device determines if a communication channel is inactive before transmitting a data packet. For example, if the communication channel is busy (e.g., some other network device in the WLAN is transmitting a packet), the network device will wait until the channel becomes inactive before transmitting the packet. In an embodiment, data packets transmitted in the WLAN each include synchronization information such as a synchronization field in a preamble of the packet. In some embodiments, a network device determines whether the channel is inactive based on whether the network device detects the synchronization field. For example, if the network device detects the synchronization field in the channel, this indicates another network device is transmitting a packet and indicates the channel is busy. In an embodiment, the network device starts receiving the data packet when the network device detects the synchronization field. For example, the network device decodes at least a portion of the data packet to determine if the data packet was addressed to the network device.

Figure 1:
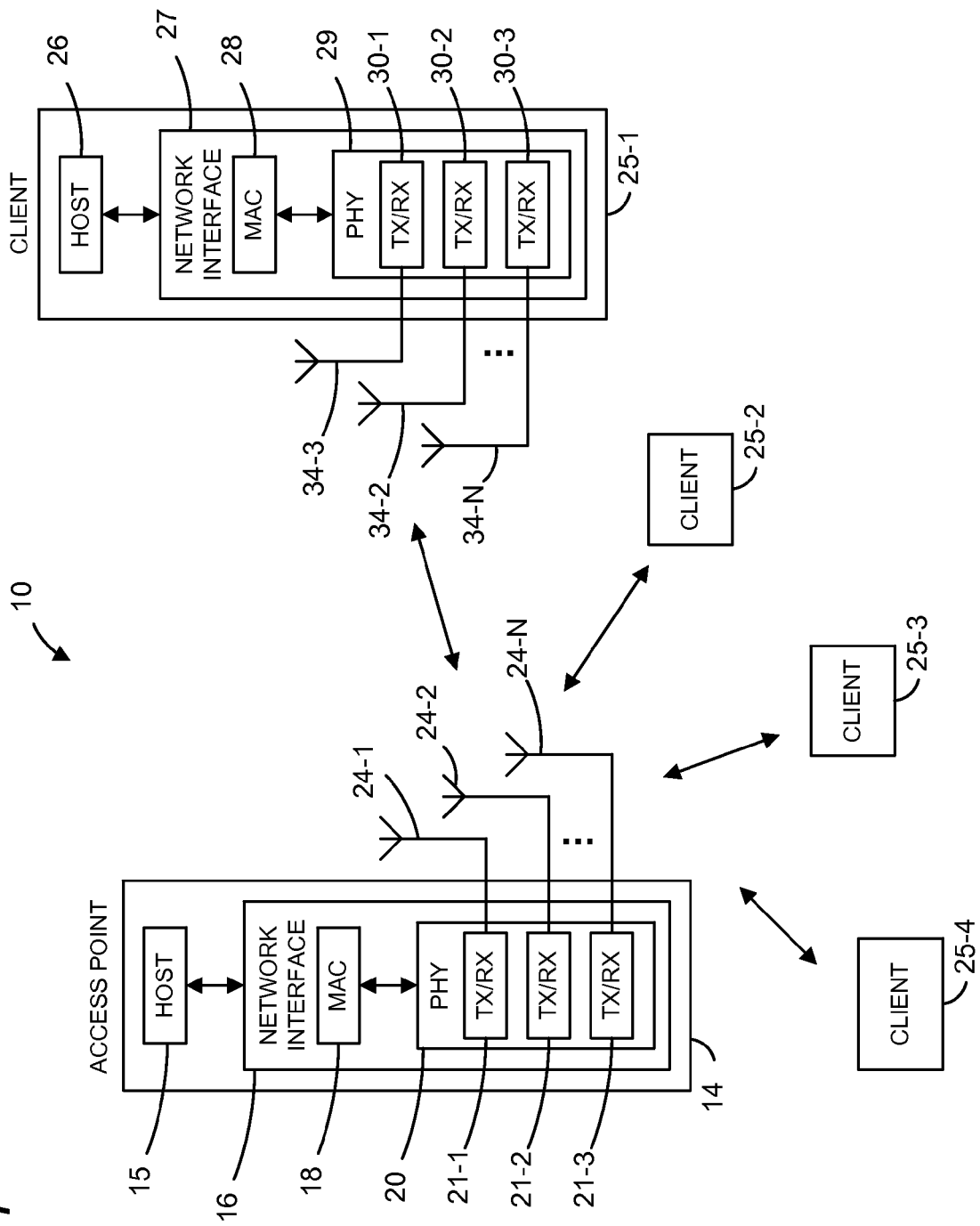
FIG. 1 is a block diagram of an example wireless local area network (WLAN) communication system in which a client device (stations) perform clear channel assessment (CCA) on communication channels, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments.

A client station 25-1 includes a host processor 26 coupled to a network interface 27. The network interface 27 includes a MAC processing unit 28 and a PHY processing unit 29. The PITY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

In an embodiment, the AP 14 and the client stations 25 communicate according to a communication protocol, such as the protocols set forth in the IEEE 802.11a/g/n Standards, or another suitable communication protocol. In embodiments in which the AP 14 and the client stations 25 communicate according to the IEEE 802.11a Standard, the AP 14 transmits data to a client station 25 in 64 orthogonal frequency division multiplexing (OFDM) sub-channels that occupy a 20 MHz channel, and the client station 25 transmits data to the AP 14 in the 64 OFDM sub-channels. The IEEE 802.11n Standard defines 20 MHz and 40 MHz communications channels. When the AP 14 and a client station 25 communicate according to the IEEE 802.11n Standard using a 20 MHz channel, the AP 14 transmits data to the client station 25 in 64 OFDM sub-channels, and the client station 25 transmits data to the AP 14 in the 64 OFDM sub-channels. When the AP 14 and the client station 25 communicate according to the IEEE 802.11n Standard using a 40 MHz channel, the AP 14 transmits data to the client station 25 in 128 OFDM sub-channels that occupy the channel, and the client station 25 transmits data to the AP 14 in the 128 OFDM sub-channels.

According to the IEEE 802.11a and the IEEE 802.11n Standards, different devices share the communication channel by utilizing a carrier sense, multiple access (CSMA) protocol. Generally speaking. CSMA, according to the IEEE 802.11a and the IEEE 802.11n Standards, specifies that a device that wishes to transmit should first check whether another device in the WLAN is already transmitting. If another device is transmitting, the device should wait for a time period and then again check again to see whether the communication channel is being used. If a device detects that the communication channel is not being used, the device then transmits a data unit using the communication channel.

The data packet transmitted using the communication channel by the AP 14 for example, includes a preamble, in an embodiment. According to the 802.11a/g/n Standards, the preamble includes a Short Training Field (STF). The STF is a periodic sequence comprising 10 periods, in which each period has a length of 0.8 microseconds (μsecs). This corresponds to a periodic signal over an 8 μsec duration with a frequency of 1/0.8 μsec or 1.25 MHz. When the AP 14 transmits a data packet through a 20 MHz communication channel to a client station for example, the PHY processing unit 20 generates an OFDM signal in which certain ones of the sub-channels are loaded (i.e., have power) during the STF whereas other sub-channels are not loaded or unloaded (i.e., do not have power), as will be described below in more detail.

In another embodiment, when the AP 14 transmits a data packet through a 40 MHz communication channel to a client device 25 according to the IEEE 802.11n Standard, for example, the PHY processing unit 20 generates an OFDM signal in which certain ones of the sub-channels are loaded during the STF whereas other sub-channels are not loaded, as will be described below in more detail.

Figure 2A:
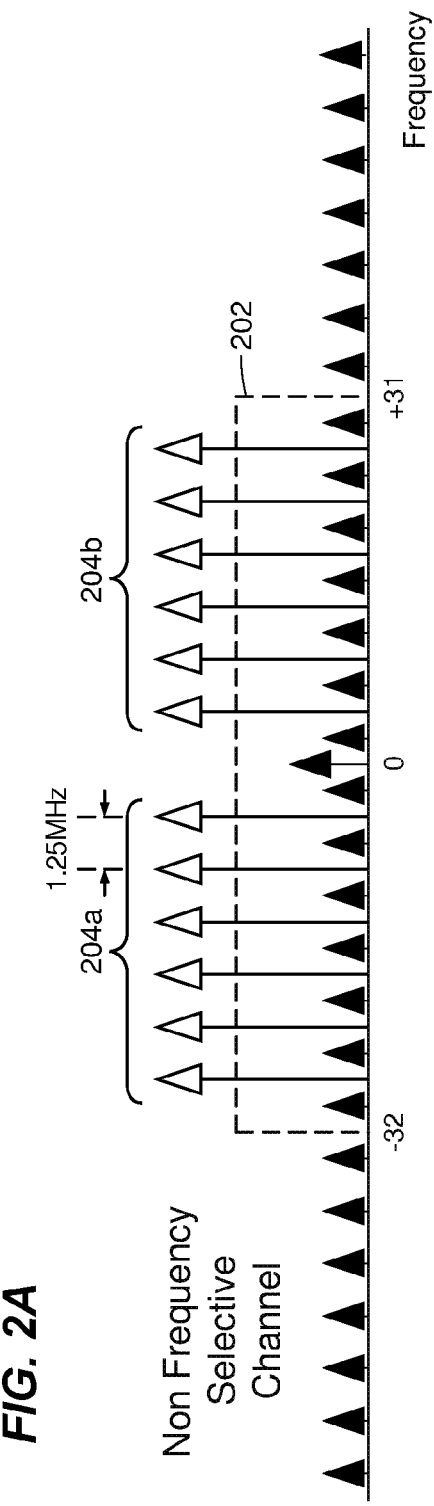
FIG. 2A is a diagram of orthogonal frequency division multiplexing (OFDM) subchannels of an example STF of a preamble.

FIG. 2A is a diagram of OFDM subchannels of an example STF of a preamble, according to an embodiment. The STF of FIG. 2A corresponds to the IEEE 802.11a/g/n Standards and to a 20 MHz channel. When the STF is sampled at 40 MHz over 1.6 μsec, and a discrete Fourier transform (DFT) (e.g., a fast Fourier transform (FFT)) is performed. 64 frequency values (subchannels) are obtained. The 64 subchannels are indexed from −32 to −31, and the spacing between each channel corresponds to 625 kHz. Loaded subchannels occur in a frequency band 202.

Because the STF includes a periodic signal with a period of 0.8 μsec, the DFT includes loaded subchannels generally spaced apart by 1.25 MHz (1/(0.8 μsec)). In an embodiment, subchannels −32 through −1 include six loaded subchannels 204a, with one non-loaded subchannel between each pair of loaded subchannels, and subchannels 0 through 31 include six loaded subchannels 204b, with one non-loaded subchannel between each pair of loaded subchannels. Thus, in an embodiment, the DFT includes twelve loaded subchannels 204 and 52 non-loaded subchannels. In an embodiment, the loaded subchannels are at indices ±2, ±4, ±6, . . . , ±12.

In an embodiment, the twelve loaded sub-channels 204 are generated with a specified power. In an embodiment, the 52 non-loaded sub-channels are generated with no power.

In an embodiment, the loaded sub-channels 204 are generated to have approximately the same magnitude during the STF of the preamble. On the other hand, the unloaded sub-channels during the STF of the preamble have approximately zero amplitude.

Figure 2B:
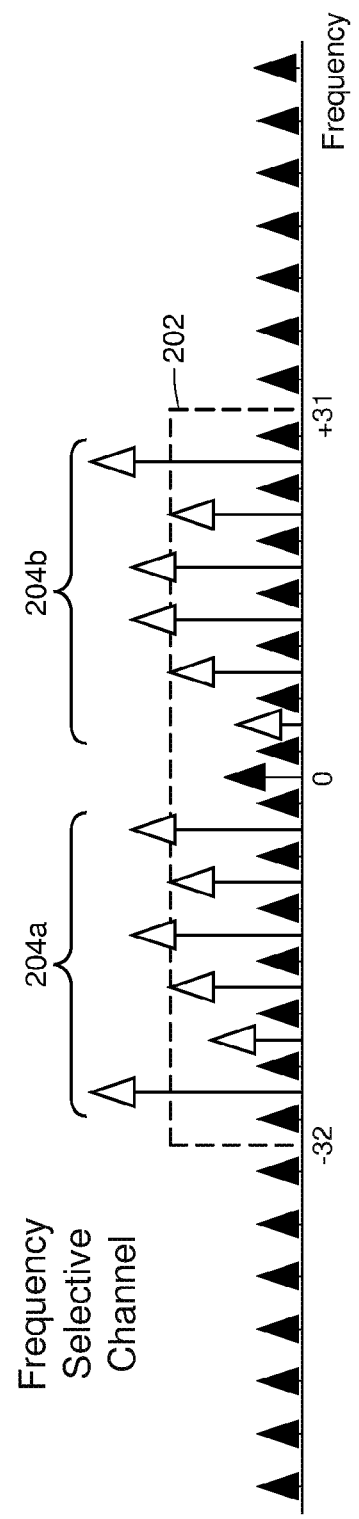
FIG. 2B is a diagram of OFDM subchannels of an example STF of a preamble, received through a frequency selective channel.

FIG. 2B is a diagram of OFDM subchannels of the example STF of FIG. 2A after transmission through a frequency selective channel (i.e., the communication channel demonstrates frequency-dependant attenuation). Because of the frequency selective channel, the loaded sub-channels 204 have different magnitudes.

In an embodiment, for a 40 MHz channel that corresponds to the IEEE 802.11n Standard, the STF is sampled at 80 MHz over 1.6 μsec, and a DFT (e.g., an FFT) is performed to obtain 128 frequency values (subchannels). The 128 subchannels are indexed from −64 to +63 in an embodiment. The spacing between each subchannel corresponds to 625 kHz. Because the STF includes a periodic signal with a period of 0.8 μsec, the DFT includes loaded subchannels generally spaced apart by 1.25 MHz (1/(0.8 μsec)). In an embodiment, subchannels −64 through −1 include twelve loaded subchannels with one non-loaded subchannel between each pair of loaded subchannels, and subchannels 0 through 63 include twelve loaded subchannels with one non-loaded subchannel between each pair of loaded subchannels. Thus, in an embodiment, the DFT of an STF in a 40 MHz channel includes 24 loaded subchannels and 104 non-loaded subchannels. In an embodiment, the DFT of the STF in the 40 MHz channel is similar to the DFT of FIG. 2A repeated in each of an upper 20 MHz band and a lower 20 MHz band.

In some embodiments, detecting a presence of an STF in a communication channel generally includes determining magnitudes or powers of subchannels that correspond to loaded subchannels in an STF and magnitudes/powers of subchannels that correspond to unloaded subchannels in the STF. Additionally, detecting the presence of an STF in a communication channel generally includes using the determined subchannel magnitude/power information to assess whether the magnitude/power information corresponds to an STF.

In an embodiment, a sum of magnitudes of sub-channels corresponding to loaded sub-channels during the STF of the preamble, for example a sum of magnitudes of subchannels at indices ±2, ±4, ±6, . . . , ±12 for a 20 MHz channel, is determined. In an embodiment, a sum of magnitudes of sub-channels corresponding to subchannels between loaded subchannels during the STF of the preamble, for example a sum of magnitudes of non-loaded subchannels between indices ±12 for a 20 MHz channel, is determined. A relative comparison of the sum of magnitudes of loaded subchannels and the sum of magnitudes of non-loaded subchannels between loaded subchannels indicates whether an STF is present, in some embodiments. In an embodiment, a ratio R1 is computed according to Equation 1.

$$R_1 = \frac{\sum\limits_{k \in \text{loaded\_subchannels}} |X_k|}{\sum\limits_{k \in \text{non-loaded\_subchannels\_between\_subchannels}} |X_k|} \quad \text{Equation 1}$$

The ratio $R_1$ indicates whether an STF is present, in some embodiments. For example, when the ratio $R_1$ is above a suitable threshold $TH_1$, this indicates an STF is present, in an embodiment.

In an embodiment, a sum of magnitudes of all sub-channels is determined. A relative comparison of the sum corresponding to loaded sub-channels and the sum corresponding to all sub-channels indicates whether an STF is present, in some embodiments.

In an embodiment, a ratio R2 is computed according to Equation 2.

$$R_2 = \frac{\sum\limits_{k \in \text{loaded\_subchannels}} |X_k|}{\sum\limits_{k \in \text{all\_subchannels}} |X_k|} \quad \text{Equation 2}$$

The ratio $R_2$ indicates whether an STF is present, in some embodiments. For example, when the ratio $R_2$ is above a suitable threshold $TH_2$, this indicates an STF is present, in an embodiment.

Figure 2C:
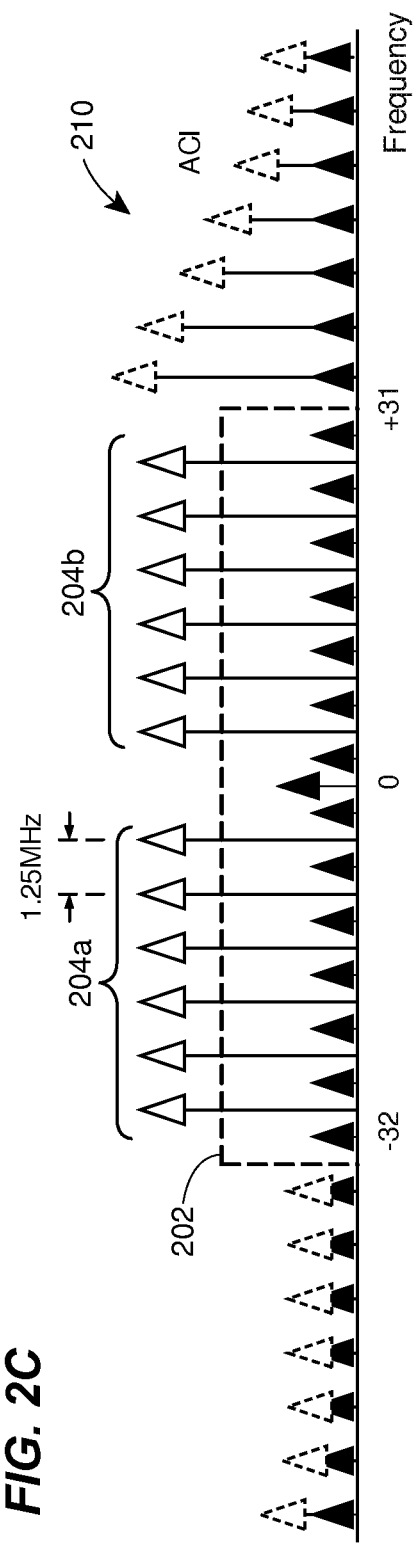
FIG. 2C is a diagram of OFDM subchannels of an example STF of a preamble with adjacent channel interference (ACI).

FIG. 2C is a diagram of OFDM subchannels of the example STF of FIG. 2A with adjacent channel interference (ACI) 210. If ACI 210 happens to occur at loaded subchannels this increases the ratio $R_1$ and may cause the ratio $R_1$ to falsely indicate an STF. On the other hand, ACI 210 tends to decrease the denominator of $R_2$. Thus, use of the ratio $R_2$ tends to reduce false positives due to ACI, at least in some embodiments and/or scenarios.

Figure 2D:
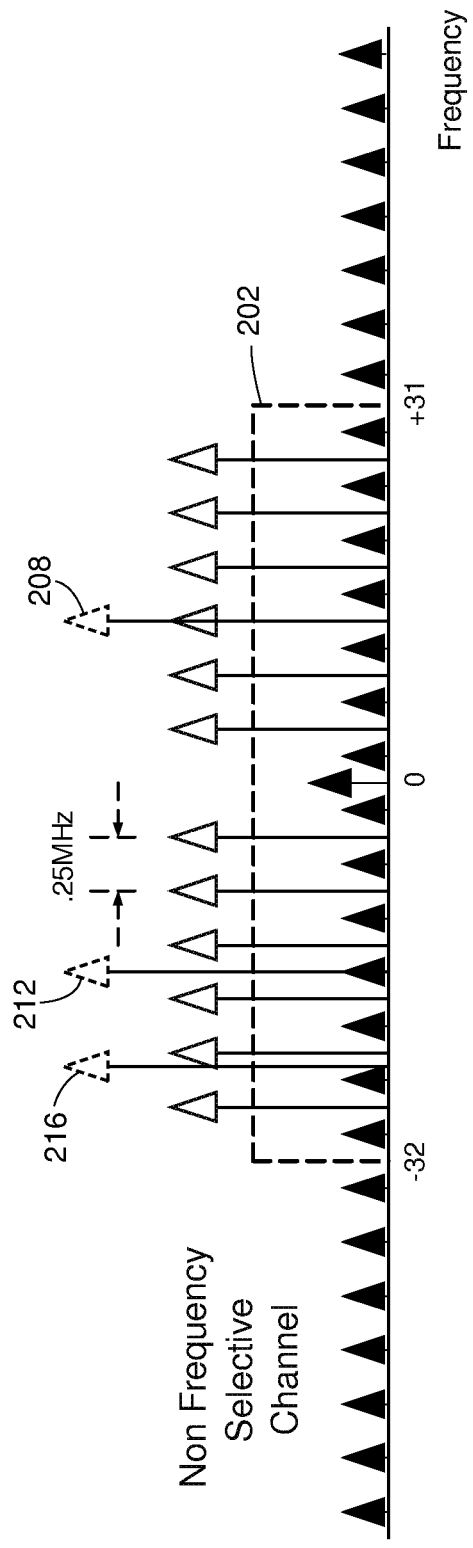
FIG. 2D is a diagram of OFDM subchannels of an example STF of a preamble with jammer or spur interference.

FIG. 2D is a diagram of OFDM subchannels of the example STF of FIG. 2A with interference from signals having a periodic component corresponding to a period of approximately 0.8 μsec. Because of the frequency selective channel, the loaded sub-channels 204 have different magnitudes. Such interference is sometimes referred to as a jammer or a spur. Hereinafter, such interference is referred to as a "jammer" for ease of explanation.

In some scenarios, a jammer occurs on a loaded subchannel. In FIG. 2D, jammer 208 occurs on a loaded subchannel. In some scenarios, a jammer occurs on an unloaded subchannel. In FIG. 2D, jammer 212 occurs on an unloaded subchannel. In some scenarios, a jammer occurs between a loaded subchannel and an unloaded subchannel. In FIG. 2D, jammer 216 occurs between a loaded subchannel and an unloaded subchannel.

When the jammer is on a loaded subchannel, both of ratios $R_1$ and $R_2$ can increase (as the jammer has all energy concentrated on a single subchannel). This may cause $R_1$ and/or $R_2$ to falsely indicate presence of an STF when only a jammer is in fact present.

When the jammer is on an unloaded subchannel, both of ratios $R_1$ and $R_2$ can decrease. This may cause $R_1$ and/or $R_2$ to falsely indicate absence of an STF when both the STF and a jammer are in fact present.

When the jammer is between a loaded subchannel and an unloaded subchannel, power of the channel will tend to leak into both a loaded subchannel and an unloaded subchannel. Thus, when the jammer is between a loaded subchannel and an unloaded subchannel, the ratios $R_1$ and $R_2$ will tend to not falsely indicate presence or absence of an STF.

In an embodiment, a maximum of magnitudes of sub-channels is determined. A relative comparison of the maximum magnitude of sub-channels and the sum corresponding to sub-channels indicates whether an STF is present, in some embodiments.

In an embodiment, a ratio $R_3$ is computed according to Equation 3.

$$R_3 = \frac{N_{subchannels} \times \max_{k \in all\_subchannels} |X_k|}{\sum |X_k|} \quad \text{Equation 3}$$

$$k \in all\_subchannels$$

The ratio $R_3$ indicates whether an STF is present, in some embodiments. For example, when the ratio $R_3$ is below a suitable threshold $TH_3$, this indicates that a jammer is not present, in an embodiment. The ratio $R_3$ thus indicates whether $R_1$ and/or $R_2$ are above thresholds $TH_1$ and $TH_2$, respectively, due to the presence of an STF or due to the presence of a jammer.

In an embodiment, a PHY processing unit such as the PHY processing unit 20 or the PHY processing unit 29 (FIG. 1), computes one or more of the $R_1$, $R_2$ and $R_3$ ratios and compares them to respective thresholds $TH_1$, $TH_2$ and/or $TH_3$. For example, in an embodiment, $R_1$ is computed and compared to threshold $TH_1$. In another embodiment, $R_2$ is computed and compared to threshold $TH_2$. In another embodiment, $R_1$ and $R_2$ are computed and compared to thresholds $TH_1$ and $TH_2$, respectively. In another embodiment, $R_1$ and $R_3$ are computed and compared to thresholds TH and $TH_3$, respectively. In another embodiment, $R_2$ and $R_3$ are computed and compared to thresholds $TH_2$ and $TH_3$, respectively. In another embodiment, $R_1$, $R_2$ and $R_3$ are computed and compared to respective thresholds $TH_1$, $TH_2$ and $TH_3$.

In an embodiment, the threshold(s) $TH_1$, $TH_2$ and/or $TH_3$ are pre-determined. In another embodiment, the PHY processing unit adapts the threshold(s) $TH_1$, $TH_2$ and/or $TH_3$ based on receiver and/or channel characteristics such as one or more of uptime, noise, temperature and RF characteristics of the communication channel, etc.

In an embodiment utilizing a 40 MHz channel, and in which the DFT of the STF in the 40 MHz channel is similar to the DFT of FIG. 2A repeated in each of an upper 20 MHz band and a lower 20 MHz band, two sets of ratios are compared to thresholds. For example, a PITY processing unit such as the PHY processing unit 20 or the PHY processing unit 29 (FIG. 1), computes one or more of the $R_1$, $R_2$ and $R_3$ ratios for the upper 20 MHz portion ($R_{1,UPPER}$, $R_{2,UPPER}$, and $R_{3,UPPER}$) and compares them to respective thresholds $TH_{1,UPPER}$, $TH_{2,UPPER}$ and/or $TH_{3,UPPER}$. Similarly, the PHY processing unit computes one or more of the $R_1$, $R_2$ and $R_3$ ratios for the lower 20 MHz portion ($R_{1,LOWER}$, $R_{2,LOWER}$ and $R_{3,LOWER}$) and compares them to respective thresholds $TH_{1,LOWER}$, $R_{2,LOWER}$ and/or $TH_{3,LOWER}$.

FIG. 3A is a diagram of an example clear channel assessment processor 300, according to an embodiment. The clear channel assessment processor 300 is included in a PHY processing unit such as the PHY processing unit 20 and/or the PHY processing unit 29 (FIG. 1), in an embodiment.

In this embodiment, a magnitude computation block 304 generates magnitudes 306 of DFT values. A ratio generation and threshold comparator (RGTC) block 308 generates one or more of ratios $R_1$, $R_2$ and $R_3$ ratios and compares them to respective thresholds $TH_1$, $TH_2$ and/or $TH_3$. In other embodiments, one or more other suitable ratios are generated and compared to suitable threshold(s). The thresholds utilized by RGTC block 308 are configurable, in an embodiment. In an embodiment, if $R_1>TH_1$, $R_2>TH_2$, and $R_3<TH_3$, then RGTC block 308 generates a signal 310 (CCA_Qualifier) that indicates an STF has been detected. If an STF is detected, this may cause a device to abort (or delay) an imminent transmission, for example.

FIG. 3B is a diagram of an example clear channel assessment processor 350, according to another embodiment. The clear channel assessment processor 350 is included in a PHY processing unit such as the PHY processing unit 20 and/or the PHY processing unit 29 (FIG. 1), in an embodiment.

In an embodiment, a magnitude computation block 354 generates magnitudes 356 of DFT values corresponding to a 40 MHz channel. An RGTC block 354 generates one or more of ratios $R_1$, $R_2$, and $R_3$ for each of two adjacent 20 MHz portions that form the 40 MHz channel. For each 20 MHz channel, the RGTC block 354 compares the one or more ratios $R_1$, $R_2$ and $R_3$ to the respective thresholds $TH_1$, $TH_2$ and/or $TH_3$. In other embodiments, one or more other suitable ratios are generated and compared to suitable threshold(s) for each 20 MHz portion. The thresholds utilized by RGTC block 308 are configurable, in an embodiment. In an embodiment, if $R_1>TH_1$, $R_2>TH_2$, and $R_3<TH_3$ for the 20 MHz portion corresponding to a control channel, then RGTC block 358 generates a signal 360 (CCA_Qualifier_CTRL) that indicates an STF has been detected in the control channel. In an embodiment, if $R_1>TH_1$, $R_2>TH_2$, and $R_3<TH_3$ for the 20 MHz portion corresponding to an extension channel, then RGTC block 358 generates a signal 368 (CCA_Qualifier_EXTN) that indicates an STF has been detected in the extension channel. If an STF is detected, this may cause a device to abort (or delay) an imminent transmission, for example.

In another embodiment, RGTC block 358 generates a single signal that indicates whether an STF was detected in either of the 20 MHz portions.

Figure 4:
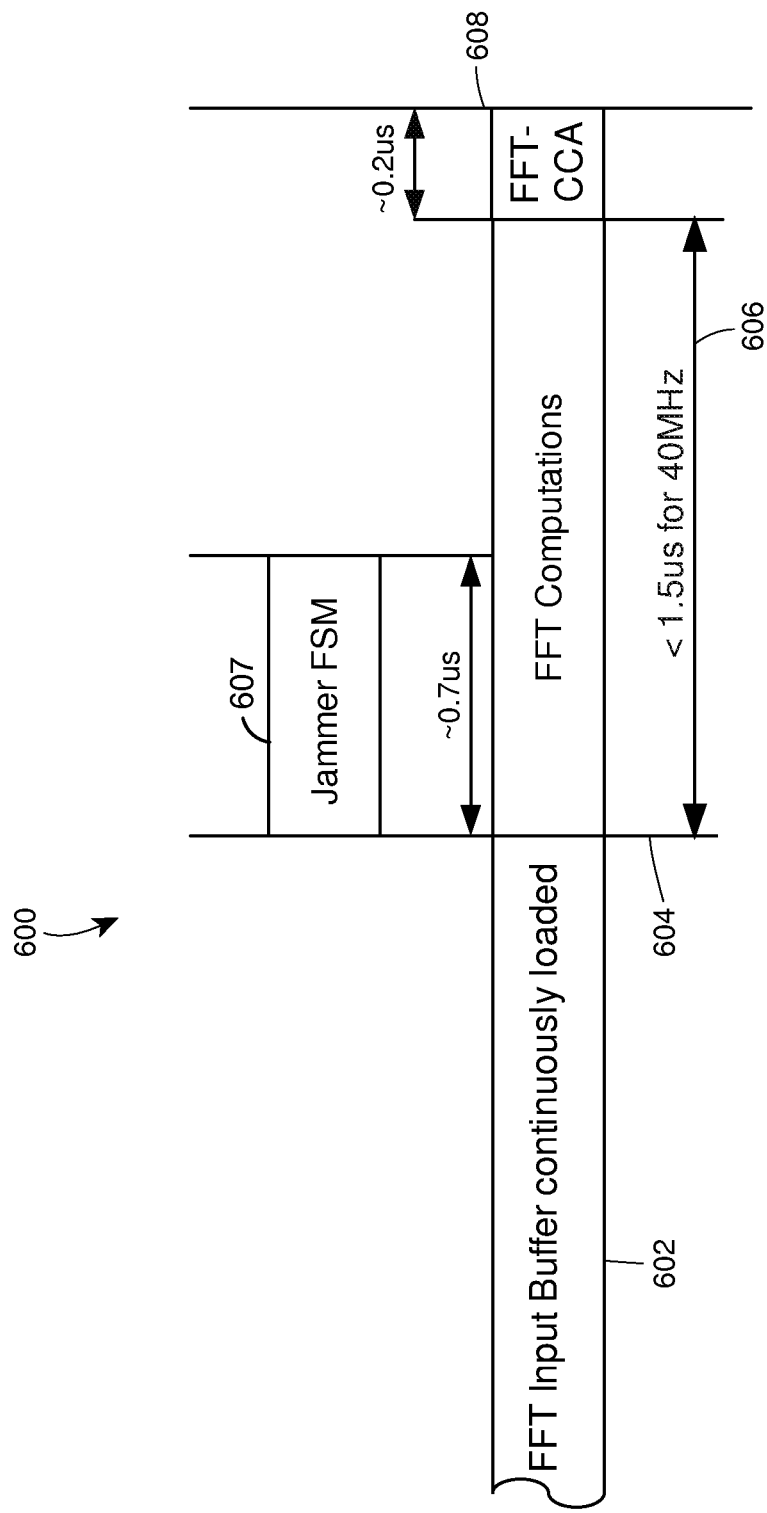
FIG. 4 is a timing diagram depicting generation of a CCA_Qualifier_CTRL signal, according to an embodiment.

FIG. 4 is a timing diagram for an example of generation of the CCA_Qualifier_CTRL signal 360, in an embodiment that utilizes the clear channel assessment processor 350 (FIG. 3B). In this example, an input buffer of an FFT processor is loaded with digitized samples of a base band signal during a time period 602. In an embodiment, when the Input Buffer is filled with 1.6 microseconds of data, the FFT processor generates FFT values during a time period 606. The time period 606 is less than 1.5 microseconds in an embodiment. In an embodiment, a finite state machine (Jammer) FSM evaluates the digitized base band signal to detect a sinusoid which is not a STF, in a time period 607. During a time period 608, the clear channel assessment processor 350 (FIG. 3B) generates magnitudes of 128 FFT values. Additionally, during the time period 608, the clear channel assessment processor 350 generates one or more of ratios $R_1$, $R_2$ and $R_3$ for each of two adjacent 20 MHz portions that form the 40 MHz channel. Additionally, during the time period 608, the clear channel assessment processor 350, for each 20 MHz channel, compares the one or more ratios $R_1$, $R_2$ and $R_3$ to the respective thresholds $TH_1$, $TH_2$ and/or $TH_3$. Additionally, during the time period 608, the clear channel assessment processor 350, for each 20 MHz channel, generates one or more indicators indicating whether an STF was detected in one or more of the 20 MHz portions.

Figure 5:
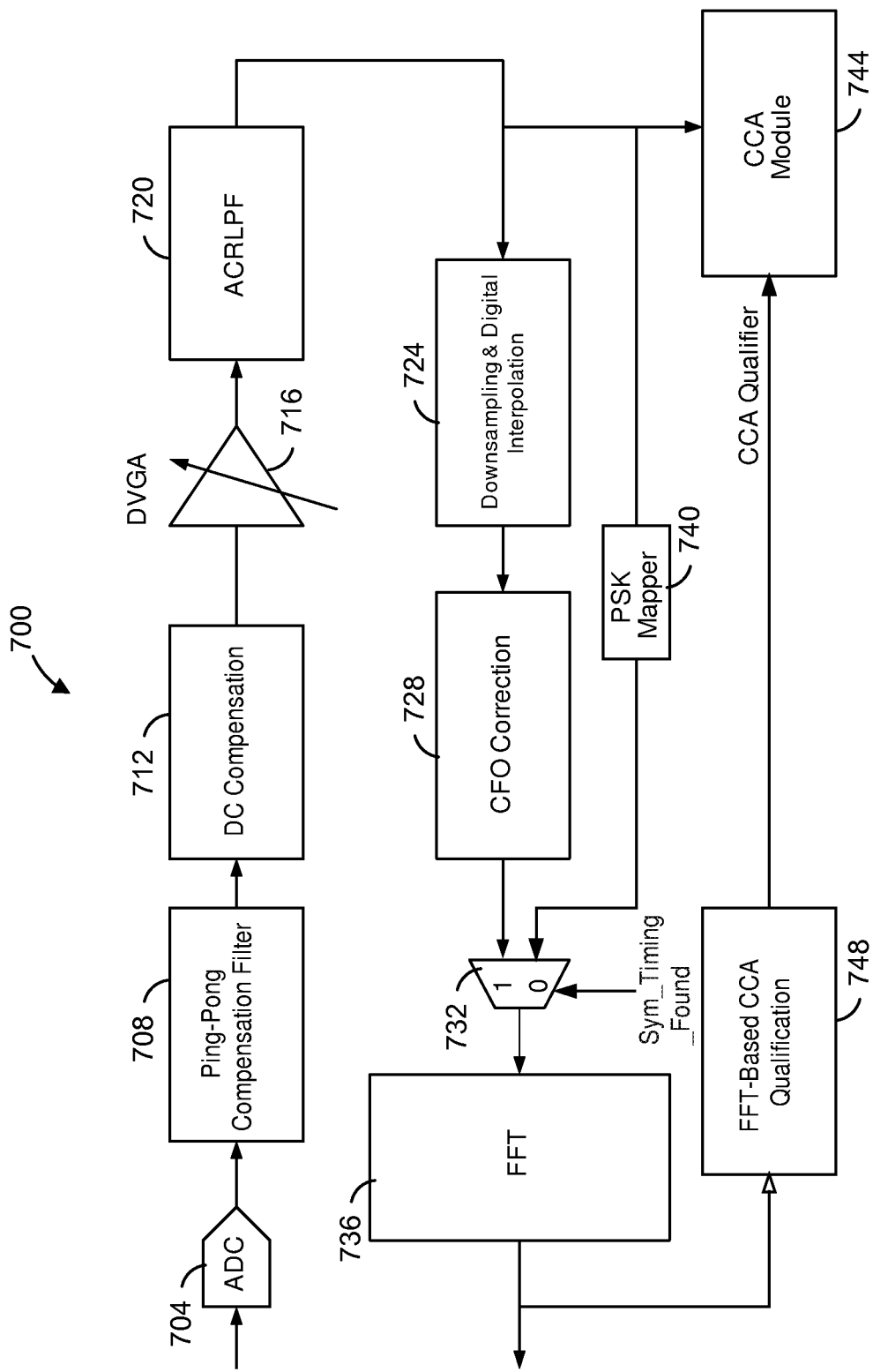
FIG. 5 is an example of a signal processor which includes an example clear channel assessment processor, according to an embodiment.

FIG. 5 is a diagram of an example signal processor 700, according to an embodiment. The signal processor 700 is included in the PHY processing unit 20 and/or the PHY processing unit 29 (FIG. 1), in some embodiments.

The signal processor 700 includes an analog-to-digital converter (ADC) 704 that digitizes a signal received from an analog front end of a receiver. A ping-pong compensation filter 708 or other suitable filter filters the digitized signal. In an embodiment, ADC 704 digitizes in-phase (I) and quadrature (Q) values in alternate sampling cycles. In this embodiment, a ping-pong compensation filter 708, compensates for the delay between the I and Q samples of the signal. A compensator 712 compensates for a direct current (DC) offset. A digital variable gain amplifier (DVGA) 716 amplifies the signal to control the gain of the signal, for example. The signal is filtered by an adjacent channel rejection low pass filter (ACRLPF) 720. In an embodiment, the ACRLPF 720 is configurable if the signal processor 700 is to handle either 20 MHz channels or 40 MHz channels, for example.

The signal is interpolated and re-sampled at a downsampling/interpolation block 724. A carrier frequency offset (CFO) correction block 728, corrects for differences in a time base between a transmitter and a receiver, for example. In an embodiment, CFO correction block 728, adjusts a digital to analog convertor (DAC) output for example, to trim a crystal oscillator.

The signal is provided via a multiplexer 732 to an FFT computation block 736. The FFT computation block 736 computes an FFT of the signal.

Output of the ACRLPF 720 is also provided to a phase-shift keying (PSK) mapper 740, which maps the signal to the unit circle. An output of the PSK mapper 740 is coupled to the FFT computation block 736 via the multiplexer 732.

Output of the ACRLPF 720 is also provided to a clear channel assessment (CCA) module 744. The CCA module 744 includes an autocorrelator (not shown) and utilizes autocorrelation to generate an indication of an STF (Sym_Timing_Found) that is used to control the multiplexer 732, in an embodiment. For example, when an autocorrelation peak is found based on autocorrelation applied to the output of the ACRLPF 720, this indicates that FFT-based processing of the signal should be performed to determine whether an STF is present, in an embodiment.

An output of the FFT computation block 736 is provided to a clear channel assessment processor 748. In an embodiment, the clear channel assessment processor 748 comprises the clear channel assessment processor 300 of FIG. 3A. In another embodiment, the clear channel assessment processor 748 comprises the clear channel assessment processor 350 of FIG. 3B. In other embodiments, another suitable clear channel assessment processor is utilized. The clear channel assessment processor 748 generates a signal (CCA_Qualifier) that indicates an STF has been detected in the channel. The CCA module 744 utilizes the output of the clear channel assessment processor 748 to determine whether the channel is clear, in an embodiment.

In operation, when the autocorrelation function of the CCA module 744 determines that an STF may be present, the multiplexer 732 is controlled to cause an output of the PSK mapper 740 to be provided to the FFT computation block 736. In an embodiment corresponding to a 20 MHz channel, the FFT computation block 736 generates 64 FFT values for signal samples over 1.6 µsec. The clear channel assessment processor 748 then evaluates the 64 FFT values as described above, for example.

Figure 6:
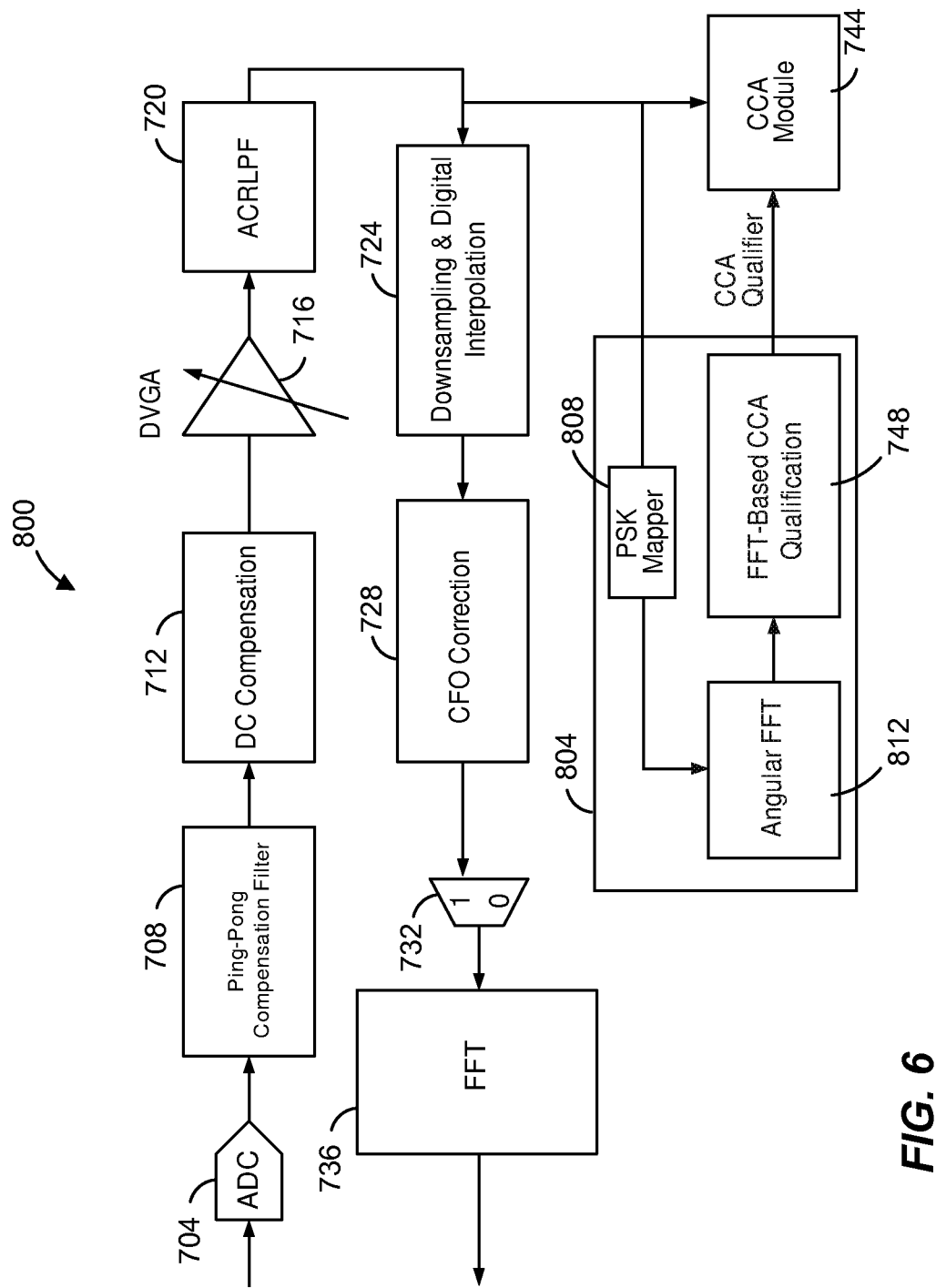
FIG. 6 is another example of a signal processor which includes an example clear channel assessment processor, according to an embodiment.

FIG. 6 is a diagram of another example signal processor 800, according to another embodiment. The signal processor 800 is included in the PHY processing unit 20 and/or the PHY processing unit 29 (FIG. 1), in some embodiments. The signal processor 800 includes some elements of the example signal processor 700 of FIG. 5, and like-numbered elements are not discussed.

The signal processor 800 includes a CCA processor 804. The CCA processor 804 includes a PSK mapper 808 similar to the PSK mapper 740 of FIG. 5. The PSK mapper 808 maps the signal to the unit circle and the output of the PSK mapper 808 is in angular units. An output of the PSK mapper 808 is coupled to an angular FFT computation block 812. The angular FFT computation block 812 generates DFT values using the angular information from the PSK mapper 808. The angular FFT computation block 812 will be described below in more detail.

An output of the angular FFT computation block 812 is provided to the clear channel assessment processor 748. The clear channel assessment processor 748 generates the signal (CCA_Qualifier) that indicates an STF has been detected in the channel. The CCA module 744 utilizes the output of the clear channel assessment processor 748 to determine whether the channel is clear, in an embodiment.

In operation, when the autocorrelation function of the CCA module 744 determines that an STF may be present, the angular FFT computation block 812 is caused to generate FFT values using the output of the PSK mapper 808. In an embodiment corresponding to a 20 MHz channel, the angular FFT computation block 812 generates 64 FFT values for signal samples over 1.6 µsec. The clear channel assessment processor 748 then evaluates the 64 FFT values as described above, for example.

When a signal is a constant amplitude signal of magnitude A, such as the output of the PSK mapper 808, the DFT can be calculated as:

$$X[k] = A \sum_{n=0}^{N-1} \exp\left(j\frac{2\pi}{N}(m[n] - kn)\right) \quad \text{Equation 4}$$

where m[n] is the angle output of the PSK mapper 808. The term m[n]−kn is computed as an integer addition, in an embodiment. The term $$\exp\left(j\frac{2\pi}{N}(m[n] - kn)\right)$$

is computed as an N-point PSK look up table (LUT), in an embodiment. The summation of Equation 4 is computed as a plurality of complex additions.

Figure 7:
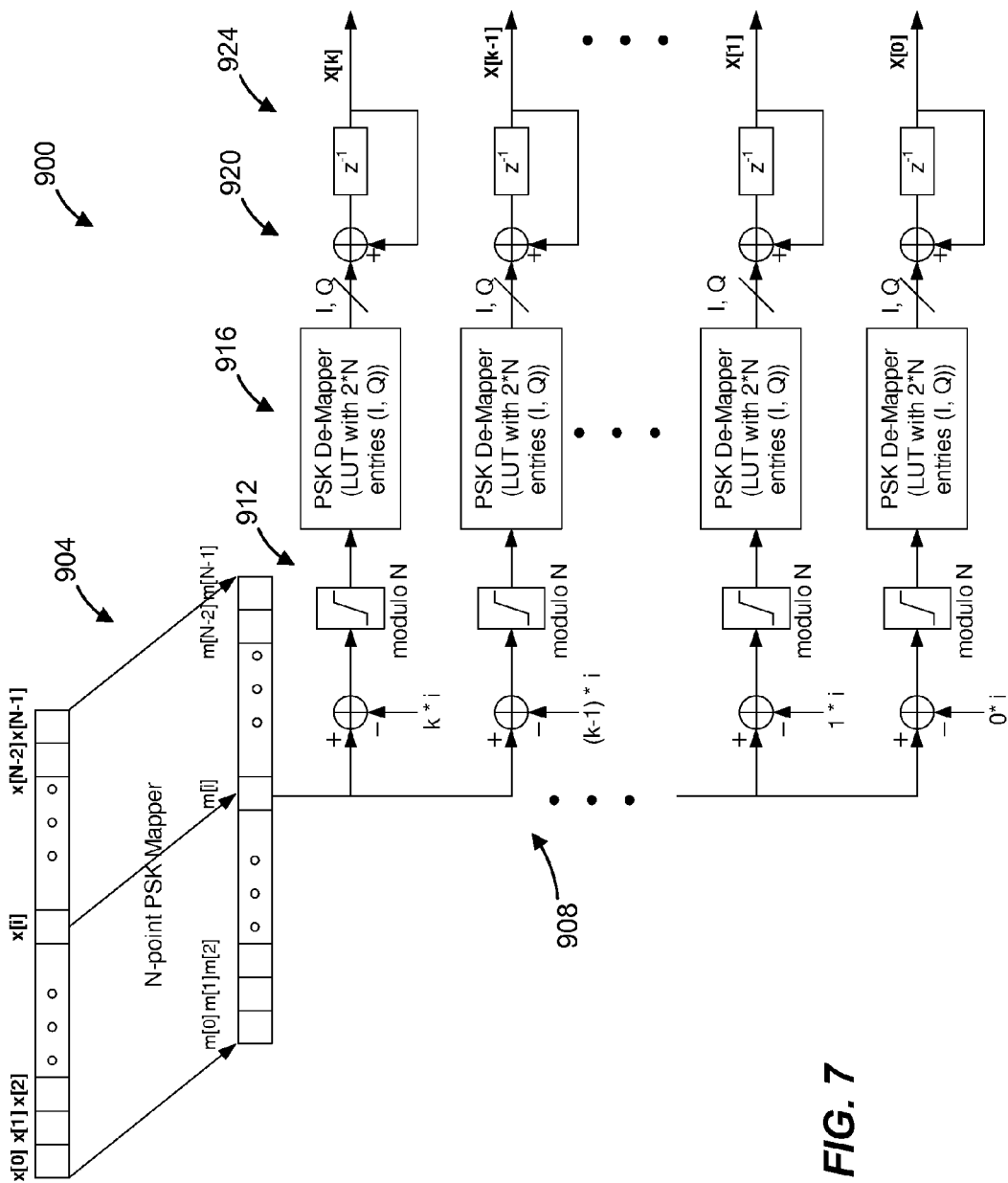
FIG. 7 is a block diagram of an example angular fast Fourier transform (FFT) calculation block of the clear channel assessment processor of the signal processor of FIG. 6, according to an embodiment.

FIG. 7 is a block diagram of an example angular FFT computation block 900, according to an embodiment. The angular FFT computation block 900 is utilized as the angular FFT computation block 812 of FIG. 6, in an embodiment.

Mapping 904 indicates operation of the PSK mapper 808 to map signal samples to angular units on the unit circle (m[n]). A plurality of subtractors 908 subtract the term kn from the angle values m[n], corresponding to each DFT index k. Thus, the plurality of subtractors 908 compute the term m[n]−kn for each DFT index k. A plurality of modulo N blocks compute the modulo-N value of the term m[n]−kn for each DFT index k. A plurality of N-point PSK LUT blocks 916 compute term $$\exp\left(j\frac{2\pi}{N}(m[n]-kn)\right)$$

for each DFT index k. A plurality of adders 920 and a plurality of delay elements 924 compute the summation of Equation 4 to generate the DFT values X[k].

The above-described STF detection apparatus and techniques were described in the context of a single received signal. In a MIMO system in which a receiver includes multiple receive chains, similar STF detection apparatus and techniques are applied to each receive chain, in an embodiment. Additionally, similar STF detection apparatus and techniques are applied to one or more combinations of the received signal, in an embodiment. Multiple STF presence indicators corresponding to individual receive chains and/or one or more combinations of the received signal are logically combined in a suitable manner to determine whether an STF is present. For example, in an embodiment, multiple STF presence indicators are combined through a logical OR operation to generate an overall indicator of an STF. In another embodiment, multiple STF presence indicators are combined through a logical AND operation to generate an overall indicator of an STF.

Figure 8:
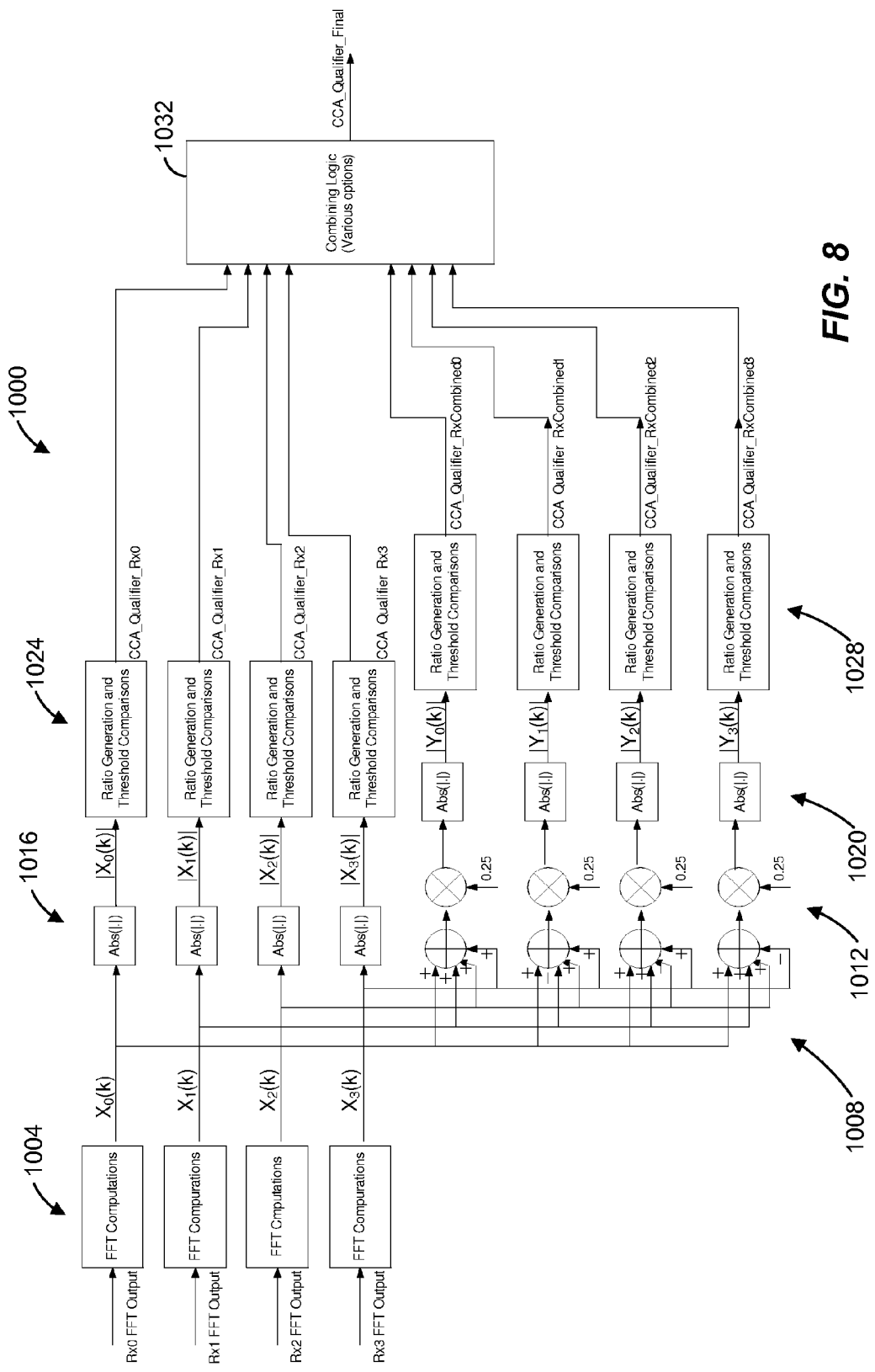
FIG. 8 is a block diagram of an example clear channel assessment system for use in a multiple-input, multiple output (MIMO) receiver having four receive chains, according to an embodiment.

FIG. 8 is a block diagram of an example clear channel assessment system 1000 for a receiver with at least four receive chains, according to an embodiment. The system 1000 includes a plurality of FFT computation blocks 1004 to compute DFT values $X_i(k)$ for each of the receive chains. Each of the FFT computation blocks 1004 are the same as or similar to the FFT computation block 736 (FIG. 5) or the angular FFT computation block 812 (FIG. 6), in some embodiments.

A plurality of adders 1008 and a plurality of multipliers 1012 generate a plurality of combinations $Y_j(k)$ of the DFT values $X_i(k)$ of the plurality of receive chains. In the example system 1000, four different combinations $Y_j(k)$ are generated. In other embodiments, a different number of combinations $Y_j(k)$ are generated, such as one, two, three, five, six, etc. The number of combinations $Y_j(k)$ to generate will depend on the number of receive chains, in some embodiments.

A plurality of magnitude calculators 1016 calculate magnitudes of the DFT values $X_i(k)$ of the receive chains. A plurality of magnitude calculators 1020 calculate magnitudes of the combinations $Y_j(k)$. A plurality of RGTC blocks 1024 generate signals that indicate whether an STF has been detected based on the DFT values $X_i(k)$. Each RGTC block 1024 is the RGTC block 308 (FIG. 3A) or the RGTC block 358 (FIG. 3B), in some embodiments. A plurality of RGTC blocks 1028 generate signals that indicate whether an STF has been detected based on the values $Y_j(k)$. Each RGTC block 1028 is the RGTC block 308 (FIG. 3A) or the RGTC block 358 (FIG. 3B), in some embodiments.

A logic block 1032 logically combines the multiple STF presence indicators in a suitable manner to generate an indicator of whether an STF is present. For example, in an embodiment, the logic block 1032 combines the multiple STF presence indicators with a logical OR operation to generate an overall indicator of an STF. In another embodiment, the logic block 1032 combines the multiple STF presence indicators with a logical AND operation to generate an overall indicator of an STF.

Figure 9:
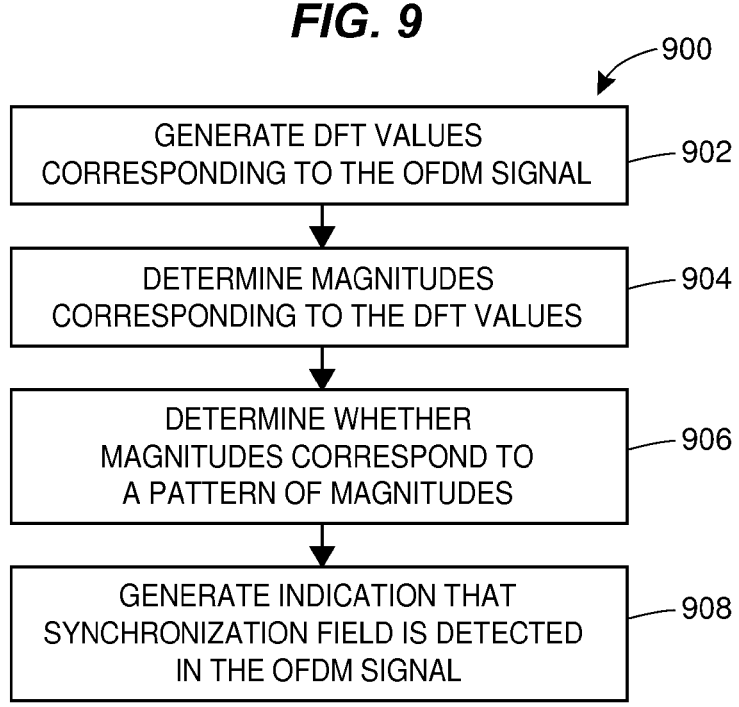
FIG. 9 is a flow diagram of an example method for detecting a synchronization field in an OFDM signal, according to an embodiment.

FIG. 9 is a flow diagram of an example method 900 for detecting a synchronization field in an OFDM signal, according to an embodiment. Referring to FIG. 1, the PHY processing unit 20 of the AP 14 is configured to implement the method 900, in an embodiment. For example, the PHY processing unit 20 of the AP 14 is configured to implement the method 900 for detecting a synchronization field in an OFDM signal. Additionally or alternatively, the PHY processing unit 29 of the client 25-1 is configured to implement the method 900, in an embodiment. For example, the PHY processing unit 29 of the client 25-1 is configured to implement the method 900 for detecting a synchronization field in an OFDM signal.

At block 902, a DFT (e.g., an FFT) is performed on a digital representation of the OFDM signal to generate a plurality of DFT values. Referring now to FIG. 5, in an embodiment, the FFT calculator 736 generates the plurality of DFT values from the angular information received from a PSK mapper 740. Referring now to FIG. 6, in another embodiment, the angular FFT calculator 812 generates a plurality of DFT values from the angular information received from the PSK mapper 808.

At block 904, a plurality of magnitude or power values, corresponding to the plurality of DFT values generated at block 902, are generated.

At block 906, it is determined whether the plurality of magnitude or power values generated at block 904 correspond to a pattern of magnitude or power values indicative of a synchronization field, such as an STF. In an embodiment, for example, the ratio $R_1$ is computed according to Equation 1 from the plurality of magnitude or power values. In an embodiment, the ratio $R_1$ is compared to a suitable threshold $TH_1$. In another embodiment, for example, a ratio $R_2$ is computed according to Equation 2 from the plurality of magnitude or power values. In an embodiment, the ratio $R_2$ is compared to a suitable threshold $TH_2$. In an embodiment, the ratio $R_3$ is computed according to Equation 3 from the plurality of magnitude or power values. In an embodiment, the ratio $R_3$ is compared to a suitable threshold $TH_3$. In other embodiments, the ratios $R_1$, $R_2$ and $R_3$, or $R_1$ and $R_2$, or $R_1$ and $R_3$, or $R_2$ and $R_3$, are computed from the plurality of magnitude or power values. In this embodiment, the ratios $R_1$, $R_2$ and/or $R_3$ are compared to suitable thresholds $TH_1$, $TH_2$ and $TH_3$ respectively at block 906.

An indication that a synchronization field is detected in the OFDM signal is generated based on determining that the plurality of magnitude or power values correspond to a pattern of magnitude or power values, at block 908. In an embodiment the synchronization field corresponds to the STF of the OFDM signal. In an embodiment, an indication that the STF is present is generated when the ratio R, computed according to equation 1 is above a suitable threshold $TH_1$. In another embodiment, an indication that the STF is present is generated when the ratio $R_2$ computed according to equation 2 is above a suitable threshold $TH_2$. In yet another embodiment, an indication that the STF is present is generated when the ratio $R_3$ computed according to equation 3 is below a suitable threshold $TH_3$. In still another embodiment, an indication that the STF is present is generated when the ratio $R_1$ and/or $R_2$ computed according to equation 1 and 2 respectively are above suitable thresholds $TH_1$ and/or $TH_2$ and the ratio $R_3$ is below a suitable threshold $TH_3$. In a MIMO system or when separate DFT portions are compared to separate patterns, separate indications are generated for different receive paths and/or different DFT portions. In these embodiments, the separate indications are logically combined to generate an overall indication, in an embodiment.

Figure 10:
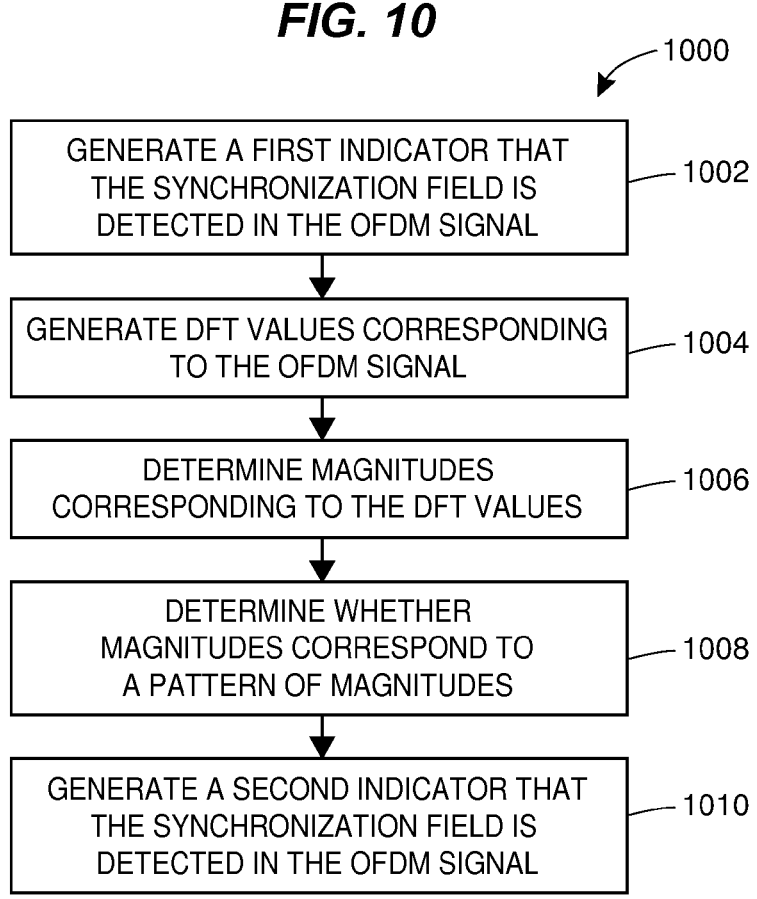
FIG. 10 is a flow diagram of an example method for detecting a synchronization field in an OFDM signal, according to another embodiment.

FIG. 10 is a flow diagram of another example method 1000 for detecting a synchronization field in an OFDM signal, according to another embodiment. Referring to FIG. 1, the PHY processing unit 20 of the AP 14 is configured to implement the method 1000, in an embodiment. For example, the PHY processing unit 20 of the AP 14 is configured to implement the method 1000 for detecting a synchronization field in an OFDM signal. Additionally or alternatively, the PHY processing unit 29 of the client 25-1, configured to implement the method 1000, in an embodiment. For example, the PHY processing unit 29 of the client 25-1 is configured to implement the method 1000 for detecting a synchronization field in an OFDM signal.

At block 1002, a first indicator is generated when a synchronization field is detected in the OFDM signal. In an embodiment, at block 1002 a first indicator is generated when a synchronization field is detected in the OFDM signal based on an output of a correlator.

In response to the first indicator indicating presence of the synchronization field, at block 1004, a DFT is performed on a digital representation of the OFDM signal to generate a plurality of DFT values. Block 1004 is similar to block 902 of FIG. 9, in an embodiment.

At block 1006, a plurality of magnitude or power values, corresponding to the plurality of DFT values generated at block 1004, are generated. Block 1006 is similar to block 904 of FIG. 9, in an embodiment.

Whether the plurality of magnitude or power values generated at block 1006 correspond to a pattern of magnitude or power values is determined at block 1008. Block 1008 is similar to block 906 of FIG. 9, in an embodiment.

An indication that a synchronization field is detected in the OFDM signal is generated based on determining that the plurality of magnitude or power values correspond to a pattern of magnitude or power values, at block 1010. Block 1010 is similar to block 908 of FIG. 9, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for detecting a synchronization field in an orthogonal frequency division multiplexing (OFDM) signal, the method comprising:
generating a plurality of discrete Fourier transform (DFT) values corresponding to the OFDM signal;
determining a plurality of magnitude or power values corresponding to the plurality of DFT values;
determining whether the plurality of magnitude or power values corresponds to a pattern of magnitude or power values, wherein the pattern of magnitude or power values comprises a first plurality of loaded subchannels and a first plurality of unloaded subchannels, and wherein determining whether the plurality of magnitude or power values corresponds to the pattern of magnitude or power values comprises
determining a first sum of magnitude or power values corresponding to loaded subchannels,
determining a second sum of magnitude or power values corresponding to at least some unloaded subchannels,
determining a first ratio of the first sum to the second sum, and
comparing the first ratio to a first threshold; and
generating an indication that the synchronization field is detected in the OFDM signal based on whether it is determined that the plurality of magnitude or power values corresponds to the pattern of magnitude or power values.

2. A method according to claim 1, wherein determining the second sum comprises determining a sum of magnitude or power values corresponding to loaded subchannels and unloaded subchannels.

3. A method according to claim 1, wherein determining the second sum comprises determining a sum of magnitude or power values corresponding to unloaded subchannels between loaded subchannels.

4. A method according to claim 3, wherein determining whether the plurality of magnitude or power values corresponds to the pattern of magnitude or power values further comprises:
determining a third sum of magnitude or power values corresponding to loaded subchannels and unloaded subchannels;
determining a second ratio of the first sum to the third sum; and
comparing the second ratio to a second threshold.

5. A method according to claim 4, wherein determining whether the plurality of magnitude or power values corresponds to the pattern of magnitude or power values further comprises:
   determining a maximum magnitude or power value;
   determining a third ratio based on i) the maximum magnitude or power value and ii) the third sum; and
   comparing the third ratio to a third threshold.

6. A method for detecting a synchronization field in an orthogonal frequency division multiplexing (OFDM) signal, the method comprising:
   generating a plurality of discrete Fourier transform (DFT) values corresponding to the OFDM signal;
   determining a plurality of magnitude or power values corresponding to the plurality of DFT values;
   determining whether the plurality of magnitude or power values corresponds to a pattern of magnitude or power values, wherein determining whether the plurality of magnitude or power values corresponds to a pattern of magnitude or power values comprises
      determining whether a first set of magnitude or power values in the plurality of magnitude or power values corresponds to a first pattern of magnitude or power values, and
      determining whether a second set of magnitude or power values in the plurality of magnitude or power values corresponds to a second pattern of magnitude or power values; and
   generating an indication that the synchronization field is detected in the OFDM signal based on whether it is determined that the plurality of magnitude or power values corresponds to the pattern of magnitude or power values.

7. A method for detecting a synchronization field in an orthogonal frequency division multiplexing (OFDM) signal, the method comprising:
   mapping the OFDM signal to a constant magnitude signal;
   generating a plurality of discrete Fourier transform (DFT) values corresponding to the OFDM signal, wherein generating the plurality of DFT values comprises generating the plurality of DFT values based on the constant magnitude signal;
   determining a plurality of magnitude or power values corresponding to the plurality of DFT values;
   determining whether the plurality of magnitude or power values corresponds to a pattern of magnitude or power values; and
   generating an indication that the synchronization field is detected in the OFDM signal based on whether it is determined that the plurality of magnitude or power values corresponds to the pattern of magnitude or power values.

8. An apparatus, comprising:
   a magnitude calculator to generate magnitudes of discrete Fourier transform (DFT) values corresponding to a received orthogonal frequency division multiplexing (OFDM) signal; and
   a ratio generator to generate one or more ratios based on the magnitudes; and
   a comparator to generate an indicator of a synchronization field in the received OFDM signal based on comparisons of the one or more ratios to respective one or more thresholds.

9. An apparatus according to claim 8, wherein the ratio generator is configured to i) determine a first sum of magnitude or power values corresponding to loaded subchannels in the synchronization field, ii) determine a second sum of magnitude or power values corresponding to at least some unloaded subchannels in the synchronization field, and iii) determine a first ratio of the first sum to the second sum; and
   wherein the comparator is configured to compare the first ratio to a first threshold.

10. An apparatus according to claim 9, wherein the ratio generator is configured to determined the second sum as a sum of magnitude or power values corresponding to loaded subchannels and unloaded subchannels.

11. An apparatus according to claim 9, wherein the ratio generator is configured to determined the second sum as a sum of magnitude or power values corresponding to unloaded subchannels in the synchronization field between loaded subchannels in the synchronization field.

12. An apparatus according to claim 11, wherein the ratio generator is configured to i) determine a third sum of magnitude or power values corresponding to loaded subchannels in the synchronization field and unloaded subchannels in the synchronization field, and ii) determine a second ratio of the first sum to the third sum; and
   wherein the comparator is configured to compare the second ratio to a second threshold.

13. An apparatus according to claim 12, wherein the ratio generator is configured to i) determine a maximum magnitude or power value, and ii) determine a third ratio based on a) the maximum magnitude or power value and b) the third sum; and
   wherein the comparator is configured to compare the third ratio to a third threshold.

14. An apparatus according to claim 8, wherein determining whether the plurality of magnitude or power values corresponds to a pattern of magnitude or power values comprises:
   determining whether a first set of magnitude or power values in the plurality of magnitude or power values corresponds to a first pattern of magnitude or power values; and
   determining whether a second set of magnitude or power values in the plurality of magnitude or power values corresponds to a second pattern of magnitude or power values.

15. An apparatus according to claim 8, wherein the ratio generator is a first ratio generator to generate one or more first ratios corresponding to a first frequency portion of the received OFDM signal,
   wherein the comparator is a first comparator to generate a first indicator of the synchronization field in the first portion of the received OFDM signal;
   wherein the apparatus further comprises:
   a second ratio generator to generate one or more second ratios based on the magnitudes, wherein the one or more second ratios correspond to a second frequency portion of the received OFDM signal; and
   a second comparator to generate a second indicator of the synchronization field in the second frequency portion of the received OFDM signal based on comparisons of the one or more second ratios to respective one or more second thresholds.

16. A method for detecting a synchronization field in an orthogonal frequency division multiplexing (OFDM) signal, the method comprising:
   generating a first indicator that the synchronization field is detected in the OFDM signal based on an output of a correlator;
   generating a plurality of discrete Fourier transform (DFT) values corresponding to the OFDM signal in response to the first indicator;

determining a plurality of magnitude or power values corresponding to the plurality of DFT values;

determining whether the plurality of magnitude or power values corresponds to a pattern of magnitude or power values; and generating a second indicator that the synchronization field is detected in the OFDM signal based on whether it is determined that the plurality of magnitude or power values corresponds to the pattern of magnitude or power values.

17. A method according to claim 16, further comprising mapping the OFDM signal to a constant magnitude signal, and wherein generating the plurality of DFT values comprises generating the plurality of DFT values based on the constant magnitude signal in response to the first indicator.

18. An apparatus, comprising:

an autocorrelator to generate a first indicator that a synchronization field is detected in a received orthogonal frequency division multiplexing (OFDM) signal;

a discrete Fourier transform (DFT) calculator to generate DFT values corresponding to the received OFDM signal in response to the first indicator;

a magnitude calculator to generate magnitudes of discrete Fourier transform (DFT) values corresponding to the received orthogonal frequency division multiplexing (OFDM) signal; and a ratio generator to generate one or more ratios based on the magnitudes; and a comparator to generate a second indicator of a synchronization field in the received OFDM signal based on comparisons of the one or more ratios to respective one or more thresholds.

19. An apparatus according to claim 18, further comprising:

a mapper to map the OFDM signal to a constant magnitude signal, and wherein the DFT calculator is configured to generate the DFT values based on the constant magnitude signal.

* * * * *